United States Patent
Maples

(10) Patent No.: US 8,279,828 B1
(45) Date of Patent: Oct. 2, 2012

(54) MANAGEMENT OF WIMAX TONES TO AVOID INTER-MODULATION INTERFERENCE

(75) Inventor: David A. Maples, Manassas, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1555 days.

(21) Appl. No.: 11/695,829

(22) Filed: Apr. 3, 2007

(51) Int. Cl.
*H04W 4/00* (2009.01)
(52) U.S. Cl. .......... 370/331; 370/208; 455/63.1
(58) Field of Classification Search ........... 455/63.1, 455/67.13, 68, 501, 114.2; 375/144, 148, 375/278, 289, 254, 346, 296; 370/317–318, 370/320, 252, 331, 208
See application file for complete search history.

(56) References Cited

U.S. PATENT DOCUMENTS

| | | | |
|---|---|---|---|
| 2007/0202903 A1* | 8/2007 | Ge et al. | 455/502 |
| 2009/0041144 A1* | 2/2009 | Biswas et al. | 375/260 |

* cited by examiner

*Primary Examiner* — Nay A Maung
*Assistant Examiner* — Angelica Perez
(74) *Attorney, Agent, or Firm* — Shook, Hardy & Bacon L.L.P.

(57) ABSTRACT

A method, system, and computer-readable media are provided for disabling tones within WiMAX signals in order to eliminate interference at third-party receivers. The method includes identifying signal to protect for a receiver, and identifying characteristics of the receiver. The method further includes identifying WiMAX signals transmitted by a base station located in a geographic region that can interfere with the protected signals. Additionally, the method includes determining an interference level between the receiver and the base station based on the protected signals, the characteristics of the receiver, and the WiMAX signals. Moreover, the method includes providing a list of tones that are to be disabled within the WiMAX signal in order to eliminate the interference level.

10 Claims, 4 Drawing Sheets

MANAGEMENT OF WIMAX TONES TO AVOID INTER-MODULATION INTERFERENCE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Base stations managed by wireless service providers transmit radio-frequency (RF) signals to support wireless communication sessions of their subscribing mobile devices. These transmitted signals may cause interference to nearby non-commercial (e.g. public safety) radio equipment that operates in the same or adjacent spectrum allocations. The interference can be intolerable if the non-commercial equipment is part of public safety or critical infrastructure systems; such systems are operated to provide emergency communications and, as such, generally cannot tolerate interference. The interference generally takes two forms: out-of-band emissions (OOBE) from the base station transmitter itself, and intermodulation (IM) products formed in the first stages of the public-safety or other non-commercial receiver from the relatively-strong signals generated by the wireless base station transmitter.

Wireless service providers are obligated to correct interference to public safety and other non-commercial systems that is caused by their base stations and other equipment. Correction of OOBE-related interference can only be done by adding filtering at the wireless service provider's base station itself. Such filtering is readily obtained, assuming the wireless provider's spectrum allocation is contiguous (as is usually the case). Correction of IM-related interference, on the other hand, can only be done through changing the base station transmitter frequencies of operation. Such retuning is practical for systems using a site-by-site channelization plan such as the Integrated Digital Enhanced Network (iDEN). However, current modern wideband technologies, such as the Worldwide Interoperability for Microwave Access (WiMAX) wireless service, do not allow for site-by-site retuning plans. In fact, there currently does not exist a method for manipulating WiMAX signals in order to eliminate interference upon third-party receivers caused by the WiMAX signals.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present invention is defined by the claims below. Embodiments of the present invention solve at least the above problems by providing a system and method, and computer-readable media for, among other things, disabling tones within WiMAX signals in order to eliminate interference at third-party receivers.

In a first aspect, a set of computer-readable media provide a method that includes identifying signals to protect for a receiver, and identifying characteristics of the receiver. The method further includes identifying WiMAX signals transmitted by a base station located in a geographic region that can interfere with the protected signals. Additionally, the method includes determining an interference level between the receiver and the base station based on the protected signals, the characteristics of the receiver, and the WiMAX signals. Moreover, the method includes providing a list of tones that are to be disabled within the WiMAX signal in order to eliminate the interference level.

In a second aspect, a system is provided that includes a base station for transmitting WiMAX signals to mobile devices. The system further includes an interference manager for determining an interference level between the base station and a receiver, and for determining tones within the WiMAX signals to disable at the base station. The system additionally includes a base station controller for disabling the tones within a WiMAX signal transmitted at the base station.

In a third aspect, a set of computer-readable media provide a method that includes receiving a list of tones that are to be disabled within a WiMAX signal transmitted by a base station, the list being determined by an algorithm that computes the list based on an interference level between the base station and a receiver, protected signals of the receiver, characteristics of the receiver, and WiMAX signals transmitted by the base station. The method further includes disabling the tones within the WiMAX signal at the base station.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Various technical terms are used throughout this description. A definition of such terms can be found in Newton's Telecom Dictionary by H. Newton, 21$^{st}$ Edition (2005). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Figure 1:
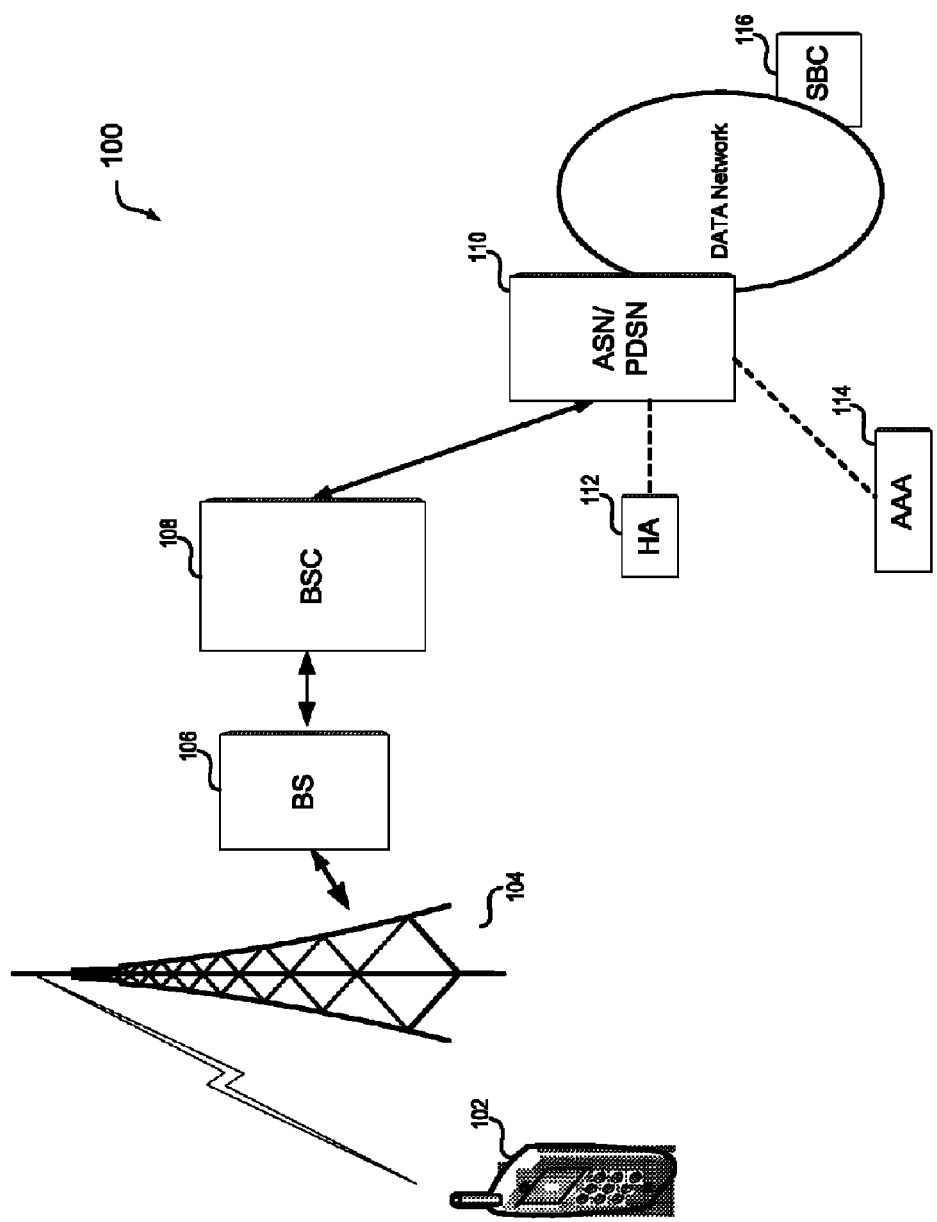
FIG. 1 is block diagram of an embodiment of a communication network that can be employed by the invention.

FIG. 1 is a block diagram of an embodiment of a communication network 100 that can be employed by the invention. Mobile device 102 may be or can include a laptop computer, a network-enabled mobile telephone (with or without media capturing/playback capabilities), a wireless email client, a personal digital assistant (PDA), or other software client. The mobile device 102 may also include a machine or device to perform various tasks including video conferencing, web browsing, search, electronic mail (email) and other tasks, applications and functions. Mobile device 102 may additionally be a portable media device such as digital camera devices, digital video cameras (with or without still image capture functionality), media players such as personal music players and personal video players, and other portable media devices. The mobile device 102 can include a communication interface that can allow the mobile device 102 to transmit information via radio signals to a communication tower 104.

The Base Station (BS) 106 contains equipment for transmitting and receiving of radio signals from a communication tower 104. BS 106 also has other equipment for encrypting and decrypting communication with the Base Station Controller (BSC) 108. The BSC 108 may be configured to receive radio signals that are converted into Time Division Multiplexing (TDM) from a BS 106. In an embodiment, the BSC 108 can have a plurality of BSs under its control. The BSC 108 may handle the allocation of radio channels, may receive measurements from mobile devices, and can control handovers from one BS to another BS. Another function of the BSC 108 is to act as a concentrator of communication sessions where many different low capacity connections to the BSs (with relatively low utilization) become reduced to a smaller number of connections towards a Mobile Switching Center (MSC) (with a high level of utilization). The BSC may also be configured to send voice information from the TDM signal to the MSC and data information to an Access Service Network (ASN) or a Packet Data Serving Node (PDSN) 110.

The ASN/PDSN 110 may be a component of a mobile network. The ASN/PDSN 110 may act as a connection point between the Radio Access and Internet Protocol (IP) networks. The ASN/PDSN 110 component may be responsible for managing Point-to-Point Protocol (PPP) sessions between the mobile device's core IP network and the mobile device. The Home Agent (HA) 112 may be a router located in a home network of the mobile device 102. The HA 112 allows a mobile device to connect to the Internet or data network by assigning an IP address and binding it to a Care-of-Address (COA). The HA 112 can forward packets to an appropriate network when a mobile device is away from its home area or home network. An authentication, authorization, and accounting (AAA) server 114 is a server program that handles user requests for access to a network and provides AAA services. The AAA server 114 may interact with network access servers, gateway servers, databases, and directories containing user information. A Session Border Controller (SBC) 116 may be a device used in some Voice over Internet Protocol (VoIP) networks to exert control over the signaling and media streams involved in setting up, conducting, and tearing down calls. The SBC 116 may be put into the signaling and/or media path between the party making a call and the party receiving the call. In an embodiment, the SBC 116 may act as a VoIP phone when it receives a call from a calling party, and can place a second call to the called party. The effect of this behavior may be that the signaling traffic and media traffic (voice, video, etc.) crosses the SBC. This behavior may also be prevalent during conference communications.

Figure 2:
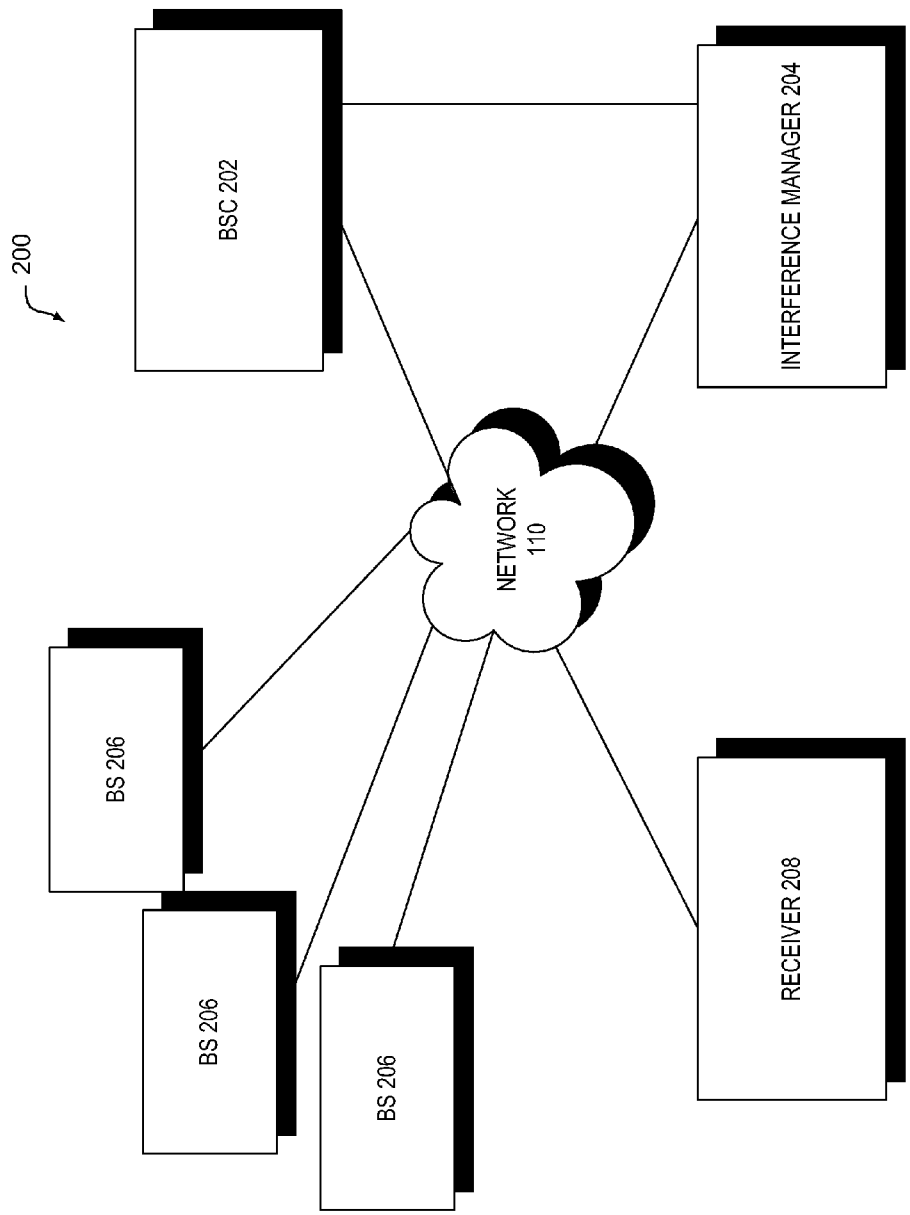
FIG. 2 is a block diagram of an exemplary system for implementing the invention.

FIG. 2 is a block diagram of an exemplary system 200 for implementing the invention. The system includes BSC 202, interference manager 204, BS 206, and network 208. In an embodiment, BSC 202, interference manager 204, BS 206, and network 208 may be managed by the same wireless communication service provider. In an embodiment, the wireless communication service provider may be configured to provide Worldwide Interoperability for Microwave Access (WiMAX) wireless service to subscribing mobile devices. In such an embodiment, BS 206 may transmit a plurality of WiMAX signals to subscribing mobile devices during each mobile device's communication session. Each WiMAX signal may comprise a plurality of individual WiMAX frequencies. These individual frequencies are called tones. A BS 206 may be a potentially interfering BS when its transmitted WiMAX signals have the potential to interfere with a third-party receiver such as receiver 208. In an embodiment, a BS 206 is a potentially interfering BS if it is located in a geographic location that is near the receiver 208. A BS 206 can be considered to be in a geographic location that can potentially interfere with the receiver 208 if the BS 206 and receiver 208 are located in the same state, city, or within a predetermined distance away from each other.

Receiver 208 is a receiver that has the potential to be interfered with by WiMAX signals transmitted by BS 206. Receiver 208 may be a receiver used with, for example, public safety radios, radios of utilities such as power companies and gas companies, and radios used by other wireless communication service providers. In an embodiment, receiver 208 may be a receiver that operates within an 800 megahertz spectrum or other frequency spectrum.

BSC 202 is utilized to disable certain tones within WiMAX signals transmitted at certain BSs 206 in order to eliminate interference upon receivers 208 caused by the transmitted WiMAX signals. BSC 202 can use interference manager 204 to determine which BSs 206 are causing an interference and which tones to disable within WiMAX signals transmitted by the BSs 206 to eliminate the interference. Interference manager 204 may be or can include a server or computing device such as a workstation running Microsoft Windows®, MacOS™, Unix™ Linux, Xenix™, IBM AIX™, Hewlett-Packard UX™, Novell Netware™, Sun Microsystems Solaris™, OS/2™, BeOS™, Mach™, Apache™, Open- Step™ or other operating system or platform. To determine which tones to disable at the base stations, the interference manager will need to be informed of certain information. This information includes, but is not limited to, the signal desired to be received at the receiver 208, the characteristics of the receiver 208, the WiMAX signals transmitted by the BS 206, and the interference level created upon the receiver by the BS 206. In an embodiment, interference manager 204 is a component within BSC 202.

Figure 3:
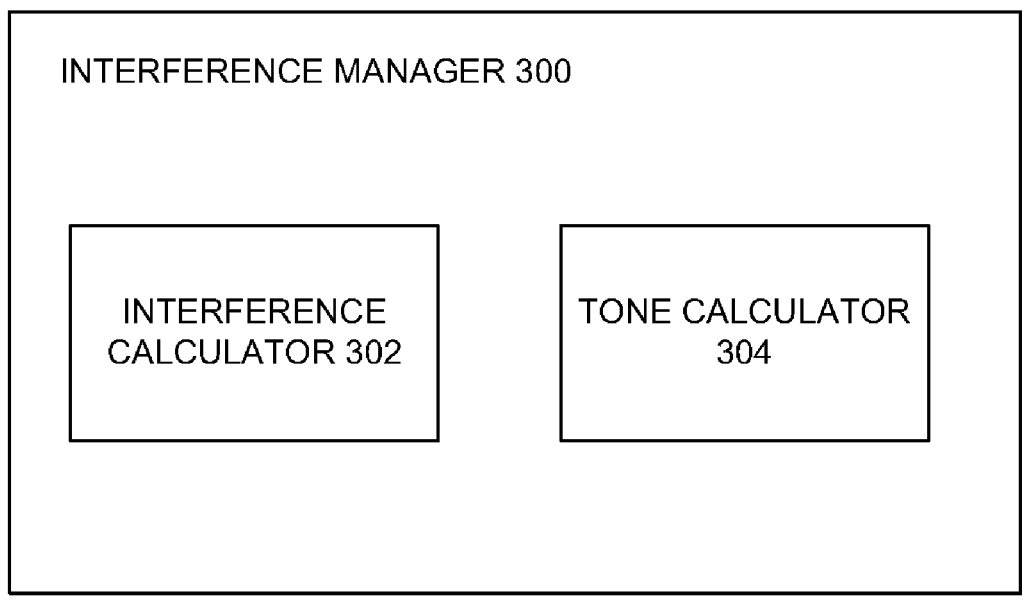
FIG. 3 is a block diagram of an embodiment of a interference manager.

FIG. 3 is a block diagram of an embodiment of an interference manager 300. Interference manager 300 includes interference calculator 302 and tone calculator 304. Interference calculator 302 is used to calculate the interference level created upon the receiver 206 by BS 206. The interference level is used to represent the strength of the interference upon the receiver 206 that is caused by the BS 206. The interference calculator may employ a conventional interference-determining algorithm to calculate the interference level. In order for the interference calculator 302 to calculate the interference level, certain information must be inputted into the interference calculator. This information includes, but is not limited to, the frequency and level of the desired signal to be received (and which therefore requires protection) at the receiver 208, the characteristics of the receiver 208, and the WiMAX signal transmitted by the BS 206 as received at receiver 208. The frequency and level of the desired signal to be received at receiver 208 may be determined by an entity managing the receiver 208 such as a public safety or other non-commercial entity for example. Such an entity may provide the interference manager 300 with the desired signal that needs to be protected for its receiver 208. Once the desired signal is received, it may be inputted into the interference calculator 302 for processing.

The characteristics of the a receiver 208 may include, but are not limited to, the reference sensitivity of the receiver, an inter-modulation rejection ratio of the receiver, and whether there is a filtering mechanism within the receiver that adjusts the level of potential interferers. The characteristics of the receiver 208 may also be provided by the entity managing or that manufactured the receiver 208. In an embodiment, the characteristics of the receiver may be measured and provided by an entity other than the entity managing the receiver 208. The WiMAX signals transmitted by a potentially interfering BS 206 may also be measured. In another embodiment, the WiMAX signals transmitted by the BS may be estimated using a conventional interference estimation model. Once the characteristics of the receiver 208 and the WiMAX signals are received, they are both inputted into the interference calculator for processing.

The interference calculator 302 can use the conventional interference-determining algorithm to calculate the interference level between the receiver 208 and one or more BSs 206. Again, the interference level will be calculated based on the inputted elements including the desired signal to be received at the receiver 208, the characteristics of the receiver 208, and the WiMAX signal transmitted by the BS 206. For IM interference to become an issue, two things have to happen: (a) The frequency of the IM product must fall within the channel bandwidth of the desired signal, and (b) the level of the IM product must be sufficiently strong to lower the ratio of desired signal to all interference and noise below the minimum for the desired signal to be recovered correctly in receiver 208. The characteristics of the receiver 208 and the relative signal streams of WiMAX signals transmitted by the BS 206 arriving at the receiver determine how strong the interference of the WiMAX signals is going to be on the receiver 208. The interference calculator 302 can be configured to output a textual or graphical representation that informs a user of the interference level caused by the BS 206.

Once the interference level between the BS 206 and the receiver 208 has been determined, the tone calculator 304 can be utilized to determine which tones to disable within the WiMAX signals transmitted by the BS 206 to eliminate the interference. The tone calculator may be equipped with an algorithm that can determine which tones to disable based on elements including, but not limited to, the interference level between the BS 206 and the receiver 208, the desired signal to be received at the receiver 208, the characteristics of the receiver 208, and the WiMAX signals transmitted by the BS 206. These elements are inputted into the algorithm and the algorithm outputs which tones to disable at the BS 206 in order to eliminate the interference. The algorithm can determine which tones to disable for a plurality of interfering BSs 206. When a plurality of BSs 206 are involved, the algorithm can determine which tones to disable on a site-by-site basis, meaning that it can determine which set of tones need to be disabled at specific BSs 206. In such an example, the algorithm may determine that a first set of tones need to be disabled at a first BS 206, while a second set of tones that are different from the first set should be disabled at another BS 206 to eliminate the overall interference.

Every time a tone is disabled at a BS, the BS loses some capacity to process data related to wireless communication sessions of its subscribing mobile devices. Accordingly, the algorithm can be configured to disable a minimum number of tones at each BS 206 to eliminate the interference problem at the receiver 206 while maintaining a predetermined capacity level at the BS. In another embodiment, the algorithm can be configured to determine if it is necessary to eliminate tones transmitted at certain mobile devices supported by the BS 206. This may be necessary in instances when the desired signals to be received at the receiver are suddenly changed, or if some other contributors in the area around either the mobile device, BS 206, or receiver 208, are suddenly changed in some way. In such an embodiment, the algorithm can determine which tones should be disabled at which specific mobile devices. Once the tone calculator 304 determines which tones to disable, the interference manager 300 can inform the BSC 202 of which tones it needs to disable at the corresponding BSs 206. With that information, the BSC 202 can proceed to disable the specified tones. In the embodiment in which tones need to be disabled at the mobile device, the interference manager 300 can inform the BSC 202 of which tones need to be disabled at which mobile devices, and the BSC 202 can proceed to command the mobile device to disable such tones.

Figure 4:
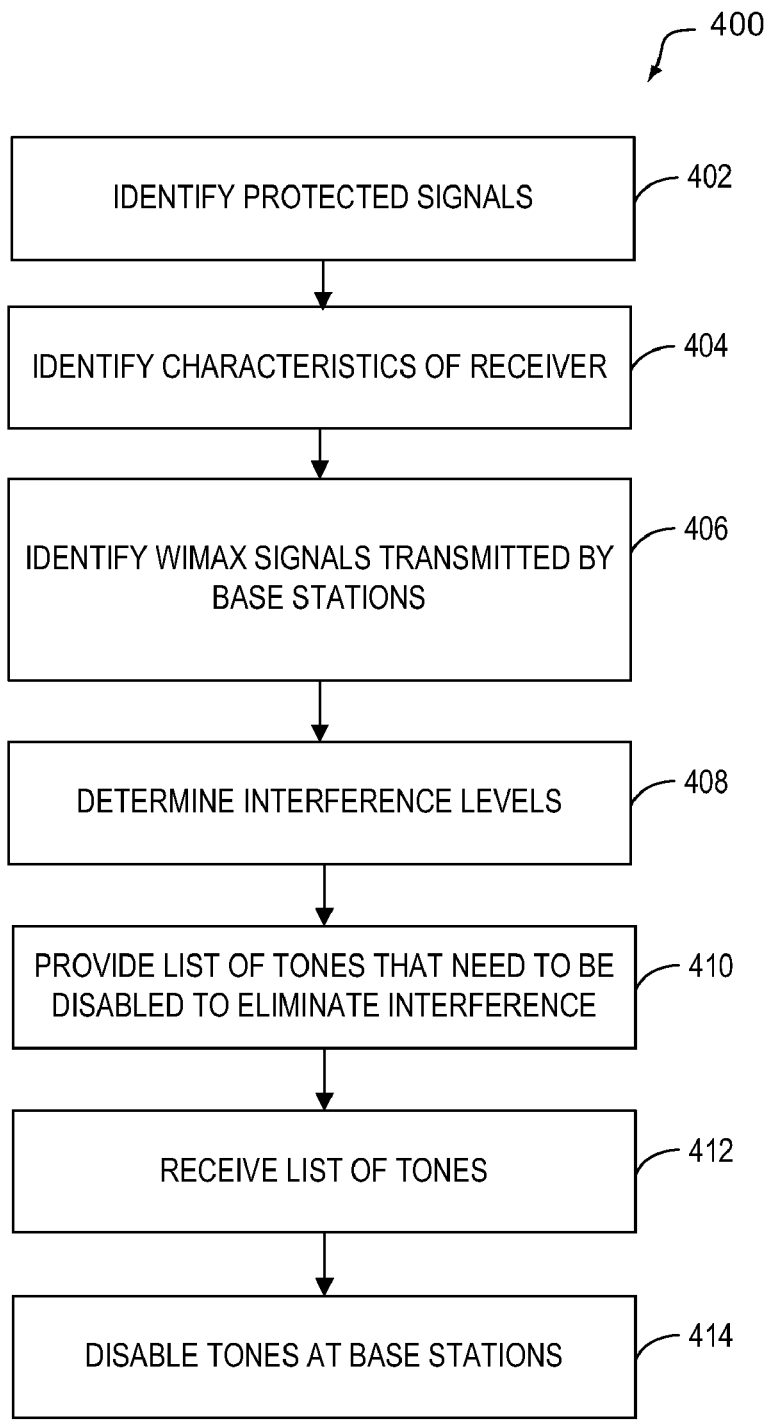
FIG. 4 is a flow diagram of an embodiment of a method for disabling tones within WiMAX signals to eliminate interference to receivers caused by base stations.

FIG. 4 is a flow diagram of an embodiment of a method 400 for disabling tones within WiMAX signals to eliminate interference to receivers caused by base stations. At operation 402, signals desired to be received by a receiver that need to be protected from interference are identified. In an embodiment, the desired signal that needs to be protected may be provided by an entity managing the receiver. In an embodiment, the desired signal may be measured. In yet another embodiment, the desired signal is the frequency at which the receiver operates. At operation 404, characteristics of the receiver are identified. In an embodiment, the characteristics of the receiver may be provided by the entity that manages or that manufactured the receiver. In another embodiment, the characteristics may be measured by an entity. At operation 406, WiMAX signals transmitted by potentially interfering BSs are identified. These signals may be estimated or measured. At operation 408, the interference level of the transmitted WiMAX signals at the receiver are determined. In an embodiment, the interference level is determined by an interference manager such as interference manager 300 and is based on the signal desired to be received at the receiver, the characteristics of the receiver, and the WiMAX signals transmitted by the BS. At operation 410, a list of tones that need to be disabled at the interfering BSs (the potentially interfering BSs that have been determined to interfere with the receiver) are provided. In an embodiment, the list is provided by the interference manager. At operation 412, the list of tones is received. In an embodiment, the list is received by a BSC. At operation 414, the specified tones on the list are disabled at the corresponding BSs. In an embodiment, the BSC will disable the tones.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more nontransitory computer-readable media having computer-useable instructions embodied thereon for performing a method of disabling tones within WiMAX signals prior to transmission by a first wireless communication service provider ("first wireless provider") in order to eliminate interference at third-party receivers, the method comprising:
    identifying one or more signals to protect ("protected signals") from interference caused by a base station associated with the first wireless provider, wherein the protected signals are to be received by a receiver associated with a second wireless communication service provider ("second wireless provider");
    identifying one or more characteristics of the receiver;
    identifying one or more WiMAX signals transmitted by the base station, wherein the base station is located in a geographic region such that the one or more WiMAX signals transmitted by the base station can interfere with the one or more signals to be received by the receiver associated with the second wireless provider;
    determining an interference level between the receiver associated with the second wireless provider and the base station associated with the first wireless provider, based on the one or more protected signals, the one or more characteristics, and the one or more WiMAX signals; and
    providing a list of one or more tones within the one or more WiMAX signals that are to be disabled at the base station prior to transmitting the one or more WiMAX signals in order to eliminate the interference.

2. The nontransitory computer-readable media according to claim 1, wherein the one or more characteristics include at least one of a reference sensitivity of the at least one receiver, an inter-modulation rejection ratio of the at least one receiver, and a filtering mechanism within the receiver.

3. The nontransitory computer-readable media according to claim 1, wherein providing the list comprises operating an algorithm to determine the one or more tones to be disabled.

4. The nontransitory computer-readable media according to claim 3, wherein the determination by the algorithm is based on at least one of the interference level, the one or more protected signals, the one or more characteristics, and the one or more WiMAX signals.

5. The nontransitory computer-readable media according to claim 1, wherein the list includes a minimum number of tones needed to eliminate the interference level and to maintain a predetermined level of capacity at the base station.

6. One or more nontransitory computer-readable media having computer-useable instructions embodied thereon for performing a method of disabling tones within WiMAX signals in order to eliminate interference at third-party receivers, the method comprising:
    receiving a list of one or more tones that are to be disabled within a WiMAX signal prior to transmitting the WiMAX signal from a base station, the list being determined by an algorithm that computes the list based on a level of interference between the base station and a third-party receiver, one or more protected signals to be received by the third-party receiver, one or more characteristics of the third-party receiver, and the WiMAX signal transmitted by the base station, wherein the interference is intermodulation interference that forms in the third-party receiver; and
    disabling the one or more tones within the WiMAX signal at the base station.

7. The nontransitory computer-readable media according to claim 6, wherein the one or more characteristics include at least one of a reference sensitivity of the third-party receiver, an inter-modulation rejection ratio of the third-party receiver, and a filtering mechanism within the third-party receiver.

8. The nontransitory computer-readable media according to claim 6, wherein an algorithm determines the one or more tones that are disabled.

9. The nontransitory computer-readable media according to claim 8, wherein the determination by the algorithm is based on at least one of the interference level, the one or more protected signals, the one or more characteristics, and the WiMAX signal.

10. The nontransitory computer-readable media according to claim 6, wherein the list includes a minimum number of tones needed to eliminate the interference level and to maintain a predetermined level of capacity at the base station.

* * * * *